(12) United States Patent
Kinoshita et al.

(10) Patent No.: US 11,407,281 B2
(45) Date of Patent: Aug. 9, 2022

(54) HEAT MANAGEMENT DEVICE

(71) Applicants: TOYOTA JIDOSHA KABUSHIKI KAISHA, Toyota (JP); SUBARU CORPORATION, Tokyo (JP)

(72) Inventors: Kohji Kinoshita, Nagoya (JP); Shoma Hanano, Toyota (JP); Yoshio Hasegawa, Toyota (JP); Manabu Orihashi, Okazaki (JP); Hideyuki Kawai, Toyota (JP); Kenichi Kubota, Toyota (JP); Makoto Ikegami, Obu (JP); Yuuki Kimura, Shibuya-ku (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 30 days.

(21) Appl. No.: 17/182,887

(22) Filed: Feb. 23, 2021

(65) Prior Publication Data
US 2021/0291625 A1    Sep. 23, 2021

(30) Foreign Application Priority Data

Mar. 17, 2020    (JP) .............................. JP2020-046883

(51) Int. Cl.
*B60H 1/08*        (2006.01)
*F01P 3/20*        (2006.01)
*B60K 11/04*       (2006.01)

(52) U.S. Cl.
CPC ............... *B60H 1/08* (2013.01); *B60K 11/04* (2013.01); *F01P 3/20* (2013.01); *F01P 2050/22* (2013.01)

(58) Field of Classification Search
CPC .................. B60H 1/08; B60H 1/32284; B60H 2001/00949; B60H 2001/00307;
(Continued)

(56) References Cited

U.S. PATENT DOCUMENTS

2012/0225341 A1* 9/2012 Major .................... B60L 3/003
                                                       429/120
2013/0020398 A1* 1/2013 Goto ......................... B60L 1/02
                                                        165/41

(Continued)

FOREIGN PATENT DOCUMENTS

JP        2017-150352 A       8/2017

*Primary Examiner* — Hung Q Nguyen
(74) *Attorney, Agent, or Firm* — Oliff PLC

(57) ABSTRACT

A heat management device may include: a first heat circuit; a second heat circuit; a heat exchanger configured to cool the first heat circuit and heat the second heat circuit; air-heating apparatus configured to heat air using the second heat circuit; a battery and electrical apparatus configured to be cooled by the first heat circuit; and a radiator configured to exchange heat between the first heat circuit and outside air. A controller may be configured, in the second process, to cause the heat exchanger to cool the heat exchanger passage while a heat medium circulates in the heat exchanger passage and the battery passage and bypasses the radiator passage. The controller may be configured, in the third process, to cause the radiator to cool the heat medium while the heat medium circulates in the radiator passage and the electrical apparatus passage and bypasses the heat exchanger passage.

6 Claims, 7 Drawing Sheets

(58) Field of Classification Search
CPC ...... B60H 2001/00928; B60H 1/00278; B60H 1/00342; F01P 3/20; B60K 2001/003
See application file for complete search history.

(56) References Cited

U.S. PATENT DOCUMENTS

| | | | |
|---|---|---|---|
| 2013/0111932 A1* | 5/2013 | Mishima | H01M 10/6568 |
| | | | 62/159 |
| 2014/0014421 A1* | 1/2014 | Carpenter | B60H 1/00278 |
| | | | 237/28 |
| 2014/0062228 A1* | 3/2014 | Carpenter | B60K 11/02 |
| | | | 310/53 |
| 2014/0096550 A1* | 4/2014 | Gao | F01P 3/12 |
| | | | 62/126 |
| 2015/0217623 A1* | 8/2015 | Hatakeyama | B60L 1/02 |
| | | | 429/62 |
| 2016/0159204 A1* | 6/2016 | Katoh | B60H 1/32284 |
| | | | 62/185 |
| 2017/0008407 A1* | 1/2017 | Porras | B60H 1/00278 |
| 2019/0078497 A1 | 3/2019 | Enomoto et al. | |
| 2019/0275858 A1* | 9/2019 | Seki | B60H 1/00328 |

* cited by examiner

HEAT MANAGEMENT DEVICE

CROSS-REFERENCE TO RELATED APPLICATION(S)

This application claims priority to Japanese Patent Application No. 2020-046883 filed on Mar. 17, 2020, the contents of which are hereby incorporated by reference into the present application.

TECHNICAL FIELD

The technology disclosed herein relates to a heat management device.

BACKGROUND

Japanese Patent Application Publication No. 2017-150352 describes a heat management device to be mounted on a vehicle. The heat management device includes a plurality of heat circuits (a heater circuit, an engine circuit, and the like) in which heat media respectively circulate. For example, the heat management device heats air in a cabin of the vehicle using the heat medium in the heater circuit as a heat source. Moreover, the heat management device cools an engine with the heat medium in the engine circuit. The heat medium in the engine circuit is cooled by a radiator.

SUMMARY

In recent years, a heat circuit that cools a battery may be mounted on a vehicle. A conventional heat management device cannot cause a radiator to cool electrical apparatus when a heat medium for cooling a battery flows in the radiator, and cannot cause the radiator to cool the battery when a heat medium for cooling the electrical apparatus flows in the radiator. The present disclosure proposes a technology that allows a heat management device that can heat air in a cabin of a vehicle to independently cool a battery and electrical apparatus.

A heat management device disclosed herein may be configured to be mounted on a vehicle. The heat management device may comprise: a first heat circuit in which a heat medium circulates, the first heat circuit comprising a heat exchanger passage, a battery passage, an electrical apparatus passage, and a radiator passage connected with each other; a second heat circuit in which a heat medium circulates; a heat exchanger configured to cool the heat medium in the heat exchanger passage and heat the heat medium in the second heat circuit by exchanging heat between the heat medium in the heat exchanger passage and the heat medium in the second heat circuit; air-heating apparatus configured to heat air in a cabin of the vehicle using the heat medium in the second heat circuit as a heat source; a battery configured to be cooled by the battery passage; electrical apparatus configured to be cooled by the electrical apparatus passage; a radiator configured to exchange heat between the heat medium in the radiator passage and outside air; at least one control valve configured to change a channel in the first heat circuit along which the heat medium flows; and a controller. The controller may be configured to execute a first process, a second process, and a third process. The controller may be configured, in the first process, to cause the radiator to heat the heat medium in the radiator passage, cause the heat exchanger to exchange heat, and cause the air-heating apparatus to heat the air in the cabin while controlling the at least one control valve so that the heat medium in the first heat circuit circulates in a first circulation channel including the heat exchanger passage and the radiator passage. The controller may be configured, in the second process, to cause the heat exchanger to cool the heat medium in the heat exchanger passage while controlling the at least one control valve so that the heat medium in the first heat circuit circulates in a second circulation channel including the heat exchanger passage and the battery passage and bypassing the radiator passage. The controller may be configured, in the third process, to cause the radiator to cool the heat medium in the radiator passage while controlling the at least one control valve so that the heat medium in the first heat circuit circulates in a third circulation channel including the radiator passage and the electrical apparatus passage and bypassing the heat exchanger passage.

The heat exchanger passage, the battery passage, the electrical apparatus passage, and the radiator passage may be connected directly with each other or may be connected with each other via another passage.

In the heat management device, in the first process, the control valve is controlled so that the heat medium flows in the first circulation channel including the heat exchanger passage and the radiator passage. In this state, the heat medium in the radiator passage (i.e., in the first circulation channel) is heated by the radiator, by which the heat medium in the second heat circuit is heated by heat exchange in the heat exchanger. The air-heating apparatus can therefore heat the air in the cabin of the vehicle using the heat medium in the second heat circuit as a heat source. As such, in the first process, the air in the cabin of the vehicle can be heated. In the second process, the control valve is controlled so that the heat medium flows in the second circulation channel including the heat exchanger passage and the battery passage and bypassing the radiator passage. In this state, the heat medium in the heat exchanger passage is cooled by the heat exchanger. The heat medium cooled by the heat exchanger is provided to the battery passage via the second circulation channel, by which the battery can be cooled. As such, in the second process, the battery can be cooled by the heat exchanger without flowing the heat medium in the radiator passage. In the third process, the control valve is controlled so that the heat medium flows in the third circulation channel including the radiator passage and the electrical apparatus passage and bypassing the heat exchanger passage. In this state, the heat medium in the radiator passage is cooled by the radiator. The heat medium cooled by the radiator is provided to the electrical apparatus passage via the third circulation channel, by which the electrical apparatus can be cooled. As such, in the third process, the electrical apparatus can be cooled by the radiator without flowing the heat medium in the heat exchanger passage. As described above, the battery can be cooled by the heat exchanger in the second process without flowing the heat medium in the radiator passage, and the electrical apparatus can be cooled by the radiator in the third process without flowing the heat medium in the heat exchanger passage. The heat management device therefore can independently cool the battery and the electrical apparatus.

DETAILED DESCRIPTION

Technological elements of a heat management device disclosed herein will be listed below. The technological elements below are independently useful.

In an aspect of the heat management device disclosed herein, the controller may be configured to execute the second process and the third process simultaneously.

In an aspect of the heat management device disclosed herein, the first circulation channel may bypass the battery passage and the electrical apparatus passage. The second circulation channel may bypass the electrical apparatus passage. The third circulation channel may bypass the battery passage.

According to these configurations, the temperature of the heat medium that flows in at least one of the first circulation channel, the second circulation channel, or the third circulation channel is further stabilized.

In an aspect of the heat management device disclosed herein, the heat management device may further comprise a cooler configured to cool the heat medium in the second heat circuit.

Figure 1:
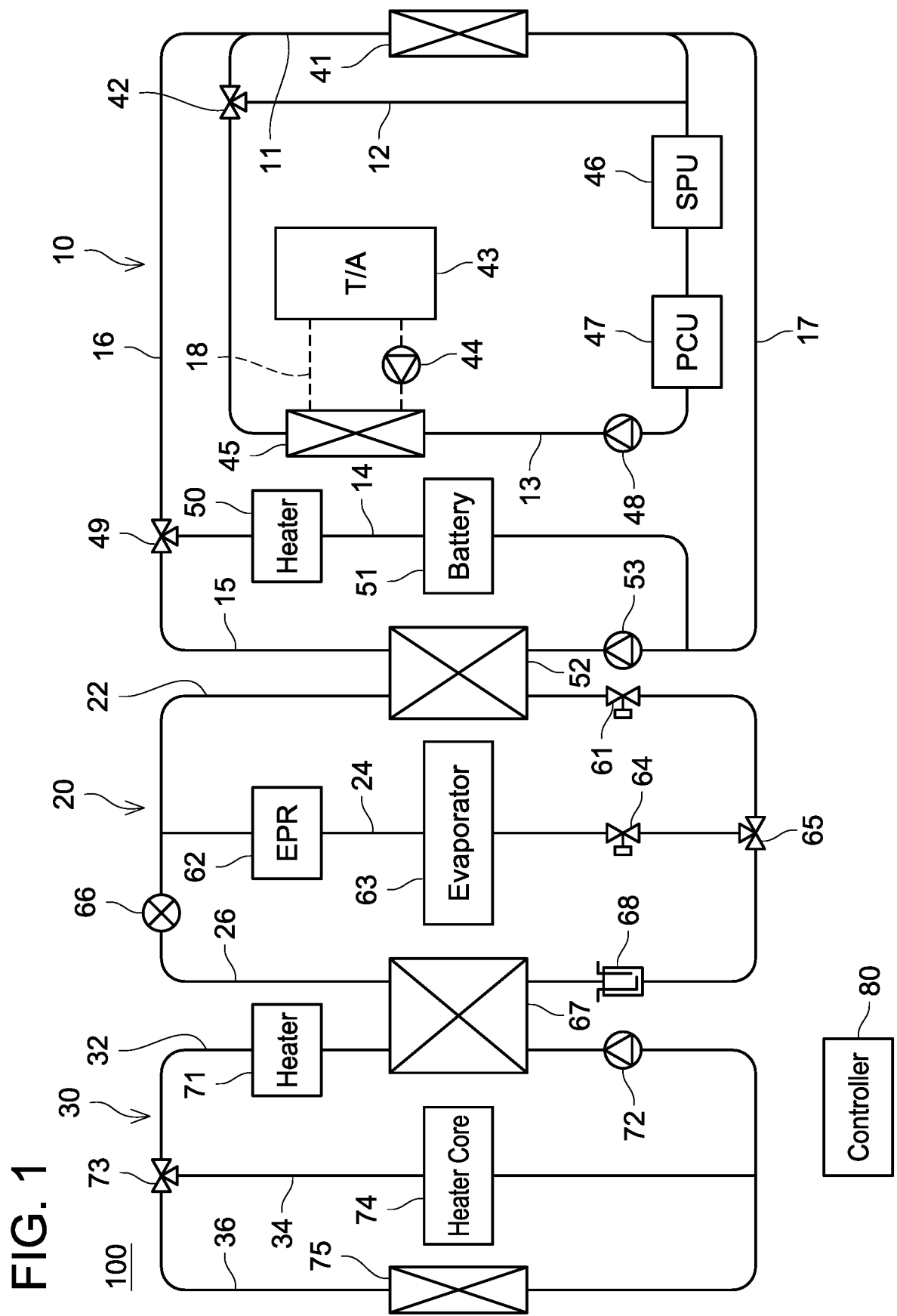
FIG. 1 is a circuit diagram of a heat management device according to an embodiment.

A heat management device 100 according to an embodiment shown in FIG. 1 includes a first heat circuit 10, a second heat circuit 20, and a third heat circuit 30. Heat media respectively flow in the first heat circuit 10, the second heat circuit 20, and the third heat circuit 30. Respective channels of the first heat circuit 10, the second heat circuit 20, and the third heat circuit 30 in which the heat media flow are independent from each other. The respective heat media in the first heat circuit 10, the second heat circuit 20, and the third heat circuit 30 may be constituted of the same material or different materials. Hydrofluorocarbons can be used as the heat media, for example. The heat management device 100 is configured to be mounted on a vehicle. The heat management device 100 can execute an air-cooling operation of cooling air in a vehicle cabin by using an evaporator 63. Moreover, the heat management device 100 can execute an air-heating operation of heating the air in the vehicle cabin by using a heater core 74. The heat management device 100 can cool a battery 51, a transaxle 43, a power control unit (PCU) 47, and a smart power unit (SPU) 46.

The first heat circuit 10 includes a low-temperature radiator passage 11, a bypass passage 12, an electrical apparatus passage 13, a battery passage 14, a chiller passage 15, a connection passage 16, and a connection passage 17.

A low-temperature radiator 41 is disposed in the low-temperature radiator passage 11. The low-temperature radiator 41 is configured to exchange heat between the heat medium in the low-temperature radiator passage 11 and outside air (i.e., air outside the vehicle). In a case where a temperature of the outside air is lower than the temperature of the heat medium in the low-temperature radiator passage 11, the heat medium in the low-temperature radiator passage 11 is cooled by the low-temperature radiator 41. In a case where the temperature of the outside air is higher than the temperature of the heat medium in the low-temperature radiator passage 11, the heat medium in the low-temperature radiator passage 11 is heated by the low-temperature radiator 41.

A downstream end of the electrical apparatus passage 13 is connected to an upstream end of the bypass passage 12 and an upstream end of the low-temperature radiator passage 11 via a three-way valve 42. An upstream end of the electrical apparatus passage 13 is connected to a downstream end of the bypass passage 12 and a downstream end of the low-temperature radiator passage 11. A pump 48 is disposed in the electrical apparatus passage 13. The pump 48 pumps the heat medium in the electrical apparatus passage 13 downstream. The three-way valve 42 is configured to switch channels to switch states between a state where the heat medium flows from the electrical apparatus passage 13 to the low-temperature radiator passage 11 and a state where the heat medium flows from the electrical apparatus passage 13 to the bypass passage 12. When the pump 48 operates while the three-way valve 42 is controlled so that the heat medium flows from the electrical apparatus passage 13 to the low-temperature radiator passage 11, the heat medium circulates in a circulation channel configured with the electrical apparatus passage 13 and the low-temperature radiator passage 11. When the pump 48 operates while the three-way valve 42 is controlled so that the heat medium flows from the electrical apparatus passage 13 to the bypass passage 12, the heat medium circulates in a circulation channel configured with the electrical apparatus passage 13 and the bypass passage 12.

The SPU 46, the PCU 47, and an oil cooler 45 are disposed in the electrical apparatus passage 13. The SPU 46 and the PCU 47 are disposed upstream of the pump 48, and the oil cooler 45 is disposed downstream of the pump 48. The SPU 46 and the PCU 47 are configured to be cooled by heat exchange with the heat medium in the electrical apparatus passage 13. The oil cooler 45 is a heat exchanger. An oil-circulation path 18 is connected to the oil cooler 45. The oil cooler 45 cools oil in the oil-circulation path 18 by heat exchange between the heat medium in the electrical apparatus passage 13 and the oil in the oil-circulation path 18. The oil-circulation path 18 is disposed to pass through the transaxle 43. The transaxle 43 has a motor built therein. The motor built in the transaxle 43 is a traction motor configured to rotate a drive wheel of the vehicle. A part of the oil-circulation path 18 is configured with a sliding portion (i.e., a bearing) of the motor. In other words, the oil in the oil-circulation path 18 is lubricating oil for an inside of the motor. An oil pump 44 is disposed in the oil-circulation path 18. The oil pump 44 circulates the oil in the oil-circulation path 18. When the oil cooled by the oil cooler 45 circulates in the oil-circulation path 18, the motor built in the transaxle 43 is cooled. The SPU 46 controls charging and discharging of the battery 51. The PCU 47 converts DC power provided from the battery 51 into AC power and provides the AC power to the motor built in the transaxle 43.

A downstream end of the chiller passage 15 is connected to an upstream end of the battery passage 14 and an upstream end of the connection passage 16 via a three-way valve 49. An upstream end of the chiller passage 15 is connected to a downstream end of the battery passage 14 and a downstream end of the connection passage 17. The connection passage 17 has an upstream end connected to a downstream end of the connection passage 16 by the low-temperature radiator passage 11. A pump 53 is disposed in the chiller passage 15. The pump 53 pumps the heat medium in the chiller passage 15 downstream. The three-way valve 49 is configured to switch channels to switch states between a state where the heat medium flows from the chiller passage 15 to the battery passage 14 and a state where the heat medium flows from the chiller passage 15 to the connection passage 16. When the pump 53 operates while the three-way valve 49 is controlled so that the heat medium flows from the chiller passage 15 to the battery passage 14, the heat medium circulates in a circulation channel configured with the chiller passage 15 and the battery passage 14. When the pump 53 operates while the three-way valve 49 is controlled so that the heat medium flows from the chiller passage 15 to the connection passage 16, the heat medium circulates in a circulation channel configured with the chiller passage 15, the connection passage 16, the low-temperature radiator passage 11, and the connection passage 17.

A chiller 52 is disposed in the chiller passage 15. The chiller 52 is disposed downstream of the pump 53. The chiller 52 is configured to cool the heat medium in the chiller passage 15 by heat exchange between the heat medium in the chiller passage 15 and the heat medium in the second heat circuit 20 (more specifically, in a chiller passage 22 described below).

A heater 50 and the battery 51 are disposed in the battery passage 14. The battery 51 is configured to provide DC power to the PCU 47. In other words, the battery 51 is configured to provide power via the PCU 47 to the motor built in the transaxle 43. The battery 51 is configured to be cooled by heat exchange with the heat medium in the battery passage 14. The heater 50 is disposed upstream of the battery 51. The heater 50 is an electric heater and heats the heat medium in the battery passage 14.

The second heat circuit 20 includes the chiller passage 22, an evaporator passage 24, and a condenser passage 26. A downstream end of the condenser passage 26 is connected to an upstream end of the chiller passage 22 and an upstream end of the evaporator passage 24 via a three-way valve 65. An upstream end of the condenser passage 26 is connected to a downstream end of the chiller passage 22 and a downstream end of the evaporator passage 24. A compressor 66 is disposed in the condenser passage 26. The compressor 66 supplies the heat medium in the condenser passage 26 downstream while compressing the heat medium. The three-way valve 65 switches channels to switch states between a state where the heat medium flows from the condenser passage 26 to the chiller passage 22 and a state where the heat medium flows from the condenser passage 26 to the evaporator passage 24. When the compressor 66 operates while the three-way valve 65 is controlled so that the heat medium flows from the condenser passage 26 to the chiller passage 22, the heat medium circulates in a circulation channel configured with the condenser passage 26 and the chiller passage 22. When the compressor 66 operates while the three-way valve 65 is controlled so that the heat medium flows from the condenser passage 26 to the evaporator passage 24, the heat medium circulates in a circulation channel configured with the condenser passage 26 and the evaporator passage 24.

A condenser 67 and a modulator 68 are disposed in the condenser passage 26. The condenser 67 is disposed downstream of the compressor 66, and the modulator 68 is disposed downstream of the condenser 67. The heat medium supplied by the compressor 66 is a high-temperature gas. The heat medium which is a high-temperature gas thus flows into the condenser 67. The condenser 67 is configured to cool the heat medium in the condenser passage 26 by heat exchange between the heat medium in the condenser passage 26 and the heat medium in the third heat circuit 30 (more specifically, in a condenser passage 32 described below). The heat medium in the condenser passage 26 condenses by being cooled in the condenser 67. The heat medium that has passed through the condenser 67 is therefore a low-temperature liquid. The heat medium which is a low-temperature liquid therefore flows into the modulator 68. The modulator 68 removes air bubbles from the heat medium which is a liquid.

An expansion valve 61 and the chiller 52 are disposed in the chiller passage 22. The chiller 52 is disposed downstream of the expansion valve 61. The heat medium that has passed through the modulator 68 (i.e., the heat medium that is a low-temperature liquid) flow into the expansion valve 61. The heat medium is decompressed as passing through the expansion valve 61. The heat medium that is a low-pressure and low-temperature liquid therefore flows into the chiller 52. The chiller 52 heats the heat medium in the chiller passage 22 and cools the heat medium in the chiller passage 15 by heat exchange between the heat medium in the chiller passage 22 and the heat medium in the chiller passage 15. In the chiller 52, the heat medium in the chiller passage 22 is heated to thereby evaporate. The heat medium in the chiller passage 22 thus efficiently absorbs heat from the heat medium in the chiller passage 15. The heat medium in the chiller passage 15 is thereby cooled efficiently. The heat medium in the chiller passage 22 that has passed through the chiller 52 (i.e., the heat medium that is a high-temperature gas) is compressed by the compressor 66 and transferred to the condenser 67.

An expansion valve 64, the evaporator 63, and an evaporator pressure regulator (EPR) 62 are disposed in the evaporator passage 24. The evaporator 63 is installed downstream of the expansion valve 64, and the EPR 62 is installed downstream of the evaporator 63. The heat medium that has passed through the modulator 68 (i.e., the heat medium that is a low-temperature liquid) flows into the expansion valve 64. The heat medium is decompressed when passing through the expansion valve 64. The heat medium that is a low-pressure and low-temperature liquid therefore flows into the evaporator 63. The evaporator 63 heats the heat medium and cools the air in the vehicle cabin by heat exchange between the heat medium in the evaporator passage 24 and the air in the vehicle cabin. In other words, the evaporator 63 executes air-cooling in the vehicle cabin. In the evaporator 63, the heat medium is heated by heat exchange to thereby evaporate. The heat medium thus efficiently absorbs heat from the air in the vehicle cabin. The air in the vehicle cabin is thereby cooled efficiently. The EPR 62 controls the flow rate of the heat medium in the evaporator passage 24 so that the pressure in the evaporator 63 remains approximately constant. The heat medium that has passed through the EPR 62 (i.e., the heat medium that is a high-temperature gas) is compressed by the compressor 66 and transferred to the condenser 67.

The third heat circuit 30 includes the condenser passage 32, a heater core passage 34, and a high-temperature radiator passage 36. A downstream end of the condenser passage 32 is connected to an upstream end of the heater core passage 34 and an upstream end of the high-temperature radiator passage 36 via a three-way valve 73. An upstream end of the condenser passage 32 is connected to a downstream end of the heater core passage 34 and a downstream end of the high-temperature radiator passage 36. A pump 72 is disposed in the condenser passage 32. The pump 72 pumps the heat medium in the condenser passage 32 downstream. The three-way valve 73 switches channels to switch states between a state where the heat medium flows from the condenser passage 32 to the heater core passage 34 and a state where the heat medium flows from the condenser passage 32 to the high-temperature radiator passage 36. When the pump 72 operates while the three-way valve 73 is controlled so that the heat medium flows from the condenser passage 32 to the heater core passage 34, the heat medium circulates in a circulation channel configured with the condenser passage 32 and the heater core passage 34. When the pump 72 operates while the three-way valve 73 is controlled so that the heat medium flows from the condenser passage 32 to the high-temperature radiator passage 36, the heat medium circulates in a circulation channel configured with the condenser passage 32 and the high-temperature radiator passage 36.

The condenser 67 and a heater 71 are disposed in the condenser passage 32. The condenser 67 is disposed downstream of the pump 72, and the heater 71 is disposed downstream of the condenser 67. The condenser 67 heats the heat medium in the condenser passage 32 and cools the heat medium in the condenser passage 26 by heat exchange between the heat medium in the condenser passage 32 and the heat medium in the condenser passage 26. The heater 71 is an electric heater and heats the heat medium in the condenser passage 32.

The heater core 74 is disposed in the heater core passage 34. The heater core 74 is configured to heat the air in the vehicle cabin by heat exchange between the heat medium in the heater core passage 34 and the air in the vehicle cabin. In other words, the heater core 74 executes air-heating in the vehicle cabin.

A high-temperature radiator 75 is disposed in the high-temperature radiator passage 36. The high-temperature radiator 75 cools the heat medium in the high-temperature radiator passage 36 by heat exchange between the heat medium in the high-temperature radiator passage 36 and the outside air.

The heat management device 100 includes a controller 80. The controller 80 is configured to control each part of the heat management device 100.

Next, operations that the controller 80 can execute will be described. The controller 80 can execute an air-heating operation, an air-cooling operation, a battery-cooling operation, and an electrical apparatus-cooling operation.

Figure 2:
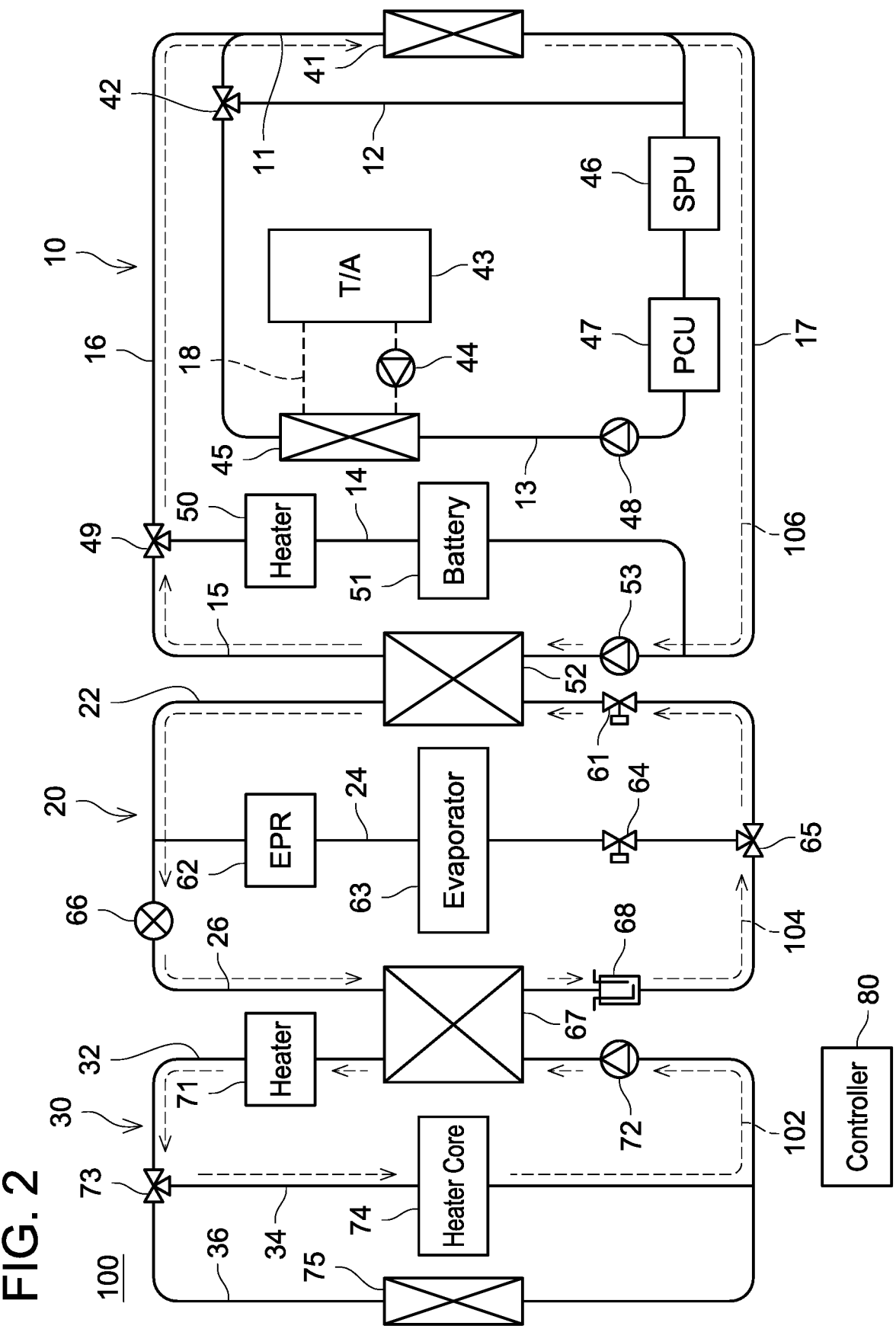
FIG. 2 is a circuit diagram showing an air-heating operation.

(Air-Heating Operation) In the air-heating operation, the controller 80 controls each part of the heat management device 100 as shown in FIG. 2. In the third heat circuit 30, the three-way valve 73 is controlled so that the heat medium flows from the condenser passage 32 to the heater core passage 34, and the pump 72 operates. The heat medium therefore circulates in a circulation channel 102 configured with the condenser passage 32 and the heater core passage 34. In the second heat circuit 20, the three-way valve 65 is controlled so that the heat medium flows from the condenser passage 26 to the chiller passage 22, and the compressor 66 operates. The heat medium therefore circulates in a circulation channel 104 configured with the condenser passage 26 and the chiller passage 22. In the first heat circuit 10, the three-way valve 49 is controlled so that the heat medium flows from the chiller passage 15 to the connection passage 16, and the pump 53 operates. The pump 48 is stopped. The heat medium therefore circulates in a circulation channel 106 configured with the chiller passage 15, the connection passage 16, the low-temperature radiator passage 11, and the connection passage 17.

In the circulation channel 106 in FIG. 2, the low-temperature heat medium cooled by the chiller 52 flows into the low-temperature radiator 41. The temperature of the heat medium that flows into the low-temperature radiator 41 is therefore lower than the temperature of the outside air. The heat medium is thus heated in the low-temperature radiator 41. Consequently, the high-temperature heat medium heated by the low-temperature radiator 41 flows into the chiller 52. In the chiller 52, the heat medium in the chiller passage 15 (i.e., the circulation channel 106) is cooled and the heat medium in the chiller passage 22 (i.e., the circulation channel 104) is heated. In the circulation channel 104, therefore, the high-temperature heat medium heated by the chiller 52 flows into the condenser 67. In the condenser 67, the heat medium in the condenser passage 26 (i.e., the circulation channel 104) is cooled and the heat medium in the condenser passage 32 (i.e., the circulation channel 102) is heated. In the circulation channel 102, therefore, the high-temperature heat medium heated by the condenser 67 flows into the heater core 74. The heater core 74 heats the air in the vehicle cabin by heat exchange between the heat medium in the circulation channel 102 and the air in the vehicle cabin. The air heated by the heater core 74 is blown by a fan (not shown). As described above, the air in the vehicle cabin is heated. As is clear from the description above, heat is provided to the heater core 74 via the heat medium in the circulation channel 104 (i.e., the heat medium in the second heat circuit 20). In other words, in the air-heating operation, the heater core 74 heats the air in the cabin of the vehicle using heat of the heat medium in the second heat circuit 20 as a heat source.

Figure 3:
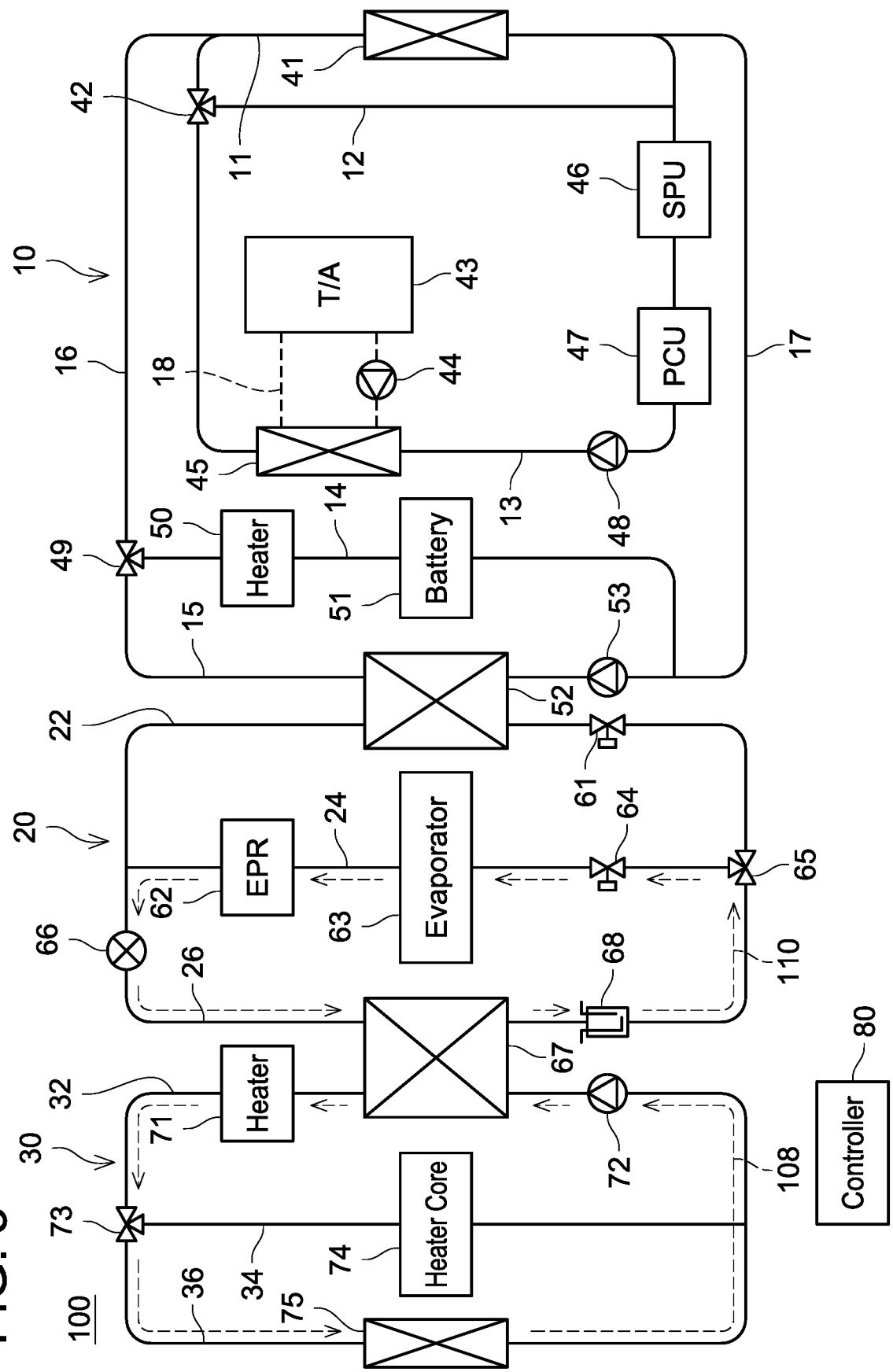
FIG. 3 is a circuit diagram showing an air-cooling operation.

(Air-Cooling Operation) In the air-cooling operation, the controller 80 controls each part of the heat management device 100 as shown in FIG. 3. In the third heat circuit 30, the three-way valve 73 is controlled so that the heat medium flows from the condenser passage 32 to the high-temperature radiator passage 36, and the pump 72 operates. The heat medium therefore circulates in a circulation channel 108 configured with the condenser passage 32 and the high-temperature radiator passage 36. In the second heat circuit 20, the three-way valve 65 is controlled so that the heat medium flows from the condenser passage 26 to the evaporator passage 24, and the compressor 66 operates. The heat medium therefore circulates in a circulation channel 110 configured with the condenser passage 26 and the evaporator passage 24. The first heat circuit 10 is not involved in the air-cooling operation.

In the circulation channel 108 in FIG. 3, the high-temperature heat medium heated by the condenser 67 flows into the high-temperature radiator 75. The temperature of the heat medium that flows into the high-temperature radiator 75 is therefore higher than the temperature of the outside air. The heat medium is thus cooled in the high-temperature radiator 75. Consequently, the low-temperature heat medium cooled by the high-temperature radiator 75 flows into the condenser 67. In the condenser 67, the heat medium in the condenser passage 32 (i.e., the circulation channel 108) is heated and the heat medium in the condenser passage 26 (i.e., the circulation channel 110) is cooled. Thus, in the circulation channel 110, the low-temperature heat medium cooled by the condenser 67 flows into the evaporator 63. The evaporator 63 cools the air in the vehicle cabin by heat exchange between the heat medium in the circulation channel 110 and the air in the vehicle cabin. The air cooled by the evaporator 63 is blown by a fan (not shown). As described above, the operation of cooling the air in the vehicle cabin is executed.

Figure 4:
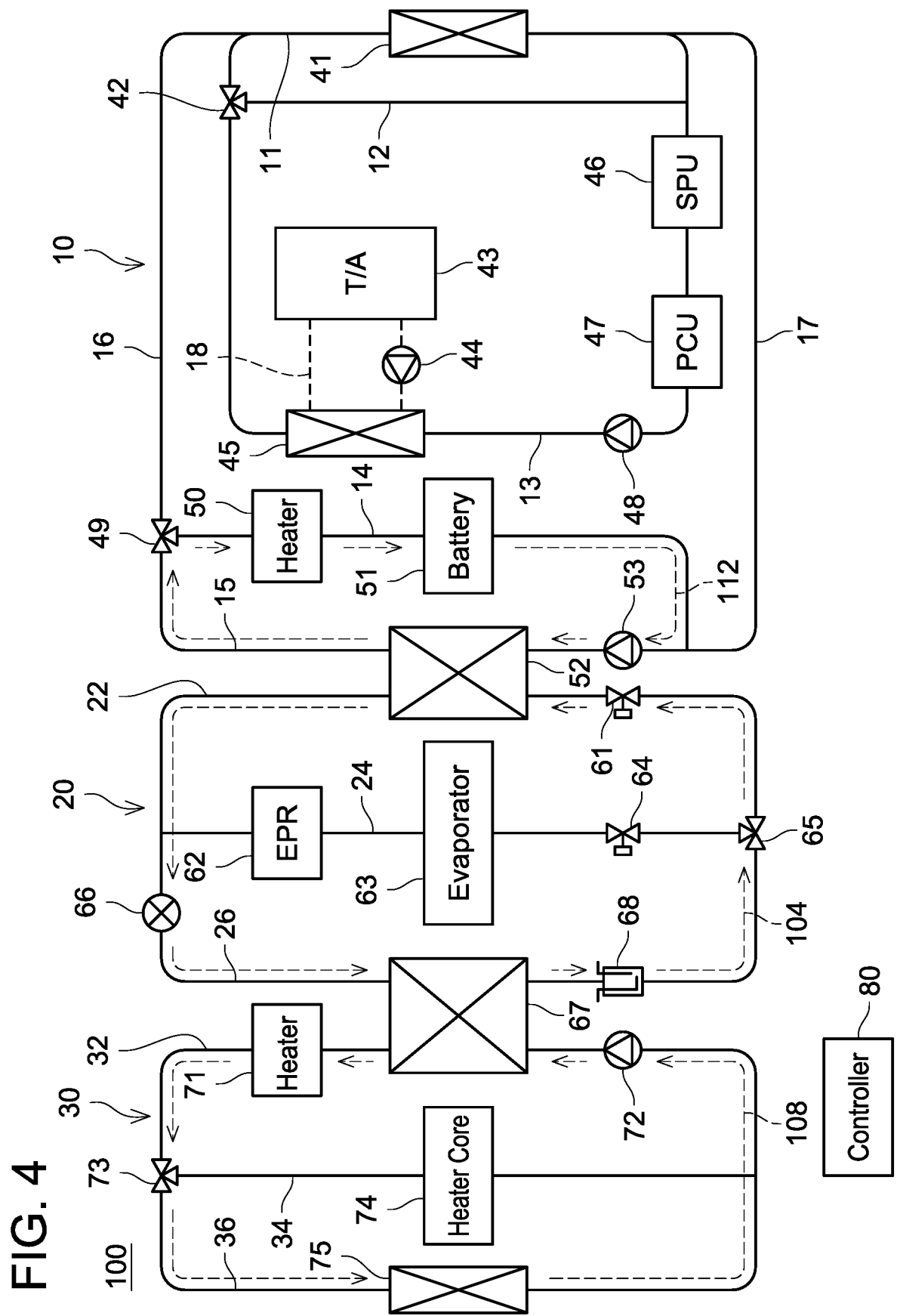
FIG. 4 is a circuit diagram showing a battery-cooling operation.

(Battery-Cooling Operation) The battery-cooling operation is executed when the temperature of the battery 51 rises to a temperature equal to or higher than a reference value. In the battery-cooling operation, the controller 80 controls each part of the heat management device 100 as shown in FIG. 4. In the third heat circuit 30, the three-way valve 73 and the pump 72 are controlled so that the heat medium circulates in the circulation channel 108 configured with the condenser passage 32 and the high-temperature radiator passage 36. In the second heat circuit 20, the three-way valve 65 and the compressor 66 are controlled so that the heat medium circulates in the circulation channel 104 configured with the condenser passage 26 and the chiller passage 22. In the first heat circuit 10, the three-way valve 49 is controlled so that the heat medium flows from the chiller passage 15 to the battery passage 14, and the pump 53 operates. The heat medium therefore circulates in a circulation channel 112 configured with the chiller passage 15 and the battery passage 14.

The circulation channel 108 in FIG. 4 operates as in FIG. 3 (i.e., in the air-cooling operation). The heat medium in the condenser passage 26 (i.e., the circulation channel 104) is therefore cooled by the condenser 67. In the circulation channel 104, therefore, the low-temperature heat medium cooled by the condenser 67 flows into the chiller 52. In the chiller 52, the heat medium in the chiller passage 22 (i.e., the circulation channel 104) is heated and the heat medium in the chiller passage 15 (i.e., the circulation channel 112) is cooled. In the circulation channel 112, therefore, the low-temperature heat medium cooled by the chiller 52 flows into the battery passage 14, by which the battery 51 is cooled. As described above, the operation of cooling the battery 51 is executed.

In the battery-cooling operation, the heat medium may flow in the heater core passage 34 in place of the high-temperature radiator passage 36. In this case, the heater core 74 cools the heat medium in the third heat circuit 30 and heats the air in the vehicle cabin. In this operation, the battery 51 is cooled and the air in the vehicle cabin is heated by the heater core 74 using waste heat generated from the battery 51.

Figure 5:
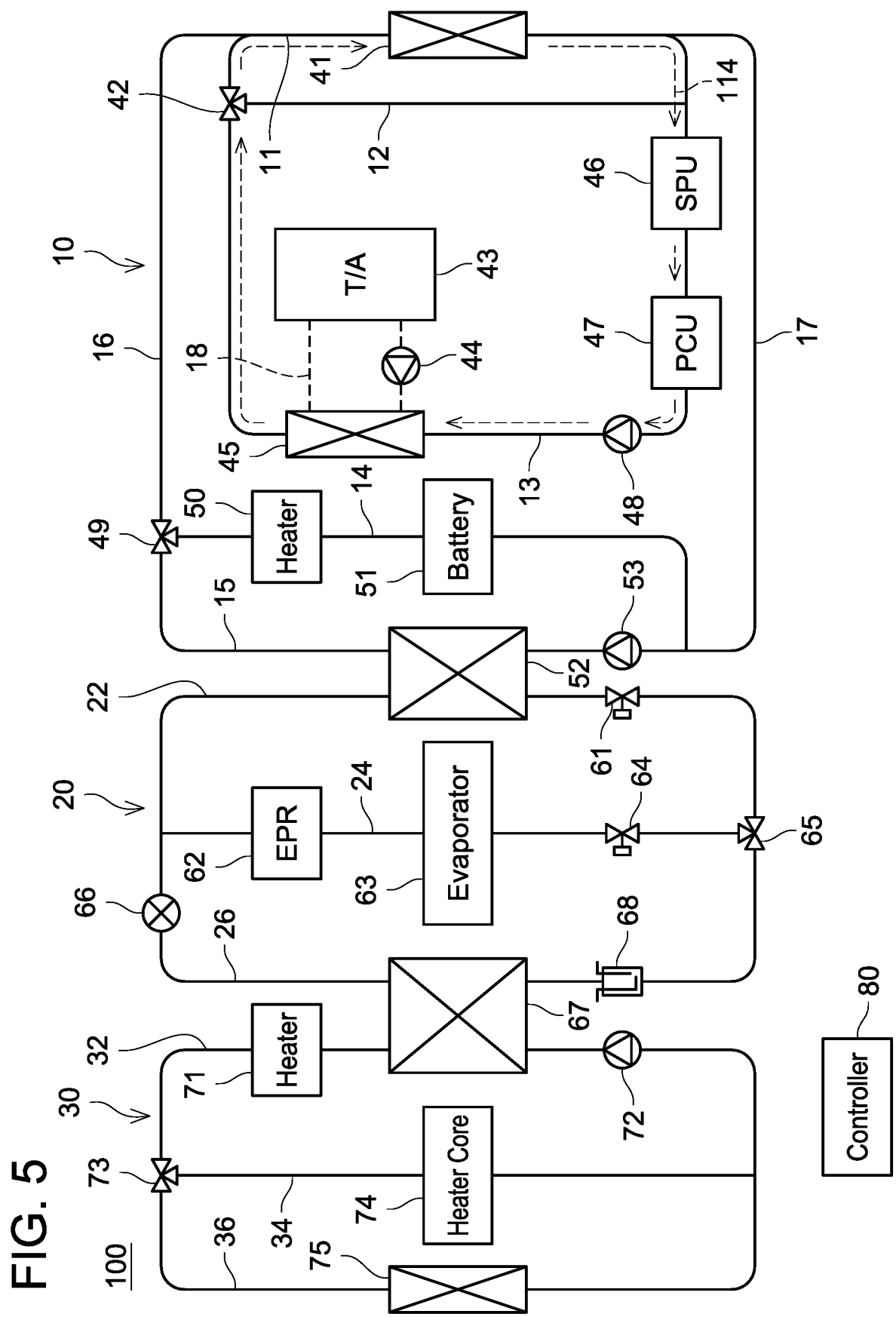
FIG. 5 is a circuit diagram showing an electrical apparatus-cooling operation.

(Electrical Apparatus-Cooling Operation) The electrical apparatus-cooling operation is executed while the SPU 46, the PCU 47, and the motor built in the transaxle 43 operate. The electrical apparatus-cooling operation may be executed when the temperature of at least one of the SPU 46, the PCU 47, and the motor exceeds a reference value. In the electrical apparatus-cooling operation, the controller 80 controls each part of the heat management device 100 as shown in FIG. 5. Neither the third heat circuit 30 nor the second heat circuit 20 is involved in the electrical apparatus-cooling operation. In the first heat circuit 10, the three-way valve 42 is controlled so that the heat medium flows from the electrical apparatus passage 13 to the low-temperature radiator passage 11, and the pump 48 operates. The heat medium therefore circulates in a circulation channel 114 configured with the electrical apparatus passage 13 and the low-temperature radiator passage 11. In the electrical apparatus-cooling operation, the oil pump 44 operates and the oil in the oil-circulation path 18 circulates.

In the circulation channel 114, the high-temperature heat medium heated by the SPU 46, the PCU 47, and the oil cooler 45 flows into the low-temperature radiator 41. The temperature of the heat medium that flows into the low-temperature radiator 41 is therefore higher than the temperature of the outside air. The heat medium in the low-temperature radiator passage 11 (i.e., the circulation channel 114) is thus cooled by the low-temperature radiator 41. In the circulation channel 114, therefore, the low-temperature heat medium cooled by the low-temperature radiator 41 flows into the electrical apparatus passage 13, and hence the SPU 46 and the PCU 47 are cooled. The oil cooler 45 cools the oil in the oil-circulation path 18 with the low-temperature heat medium. Consequently, the cooled oil is provided to the motor built in the transaxle 43, and the motor is cooled. As described above, the electrical apparatus-cooling operation to cool the electrical apparatus (i.e., the SPU 46, the PCU 47, and the motor) is executed.

As described above, the circulation channel 112 formed in the first heat circuit 10 in the battery-cooling operation does not include the low-temperature radiator passage 11. In other words, the circulation channel 112 bypasses the low-temperature radiator passage 11. Moreover, the circulation channel 114 formed in the first heat circuit 10 in the electrical apparatus-cooling operation does not include the chiller passage 15. In other words, the circulation channel 114 bypasses the chiller passage 15. The battery-cooling operation and the electrical apparatus-cooling operation can therefore be executed independently with no interference between the circulation channel 112 and the circulation channel 114. For example, the battery-cooling operation can be executed without execution of the electrical apparatus-cooling operation, the electrical apparatus-cooling operation can be executed without execution of the battery-cooling operation, and the battery-cooling operation and the electrical apparatus-cooling operation can be executed simultaneously. Since the circulation channel 112 bypasses the electrical apparatus passage 13 and the circulation channel 114 bypasses the battery passage 14, the circulation channel 112 and the circulation channel 114 can be separated completely.

The circulation channel 106 formed in the first heat circuit 10 in the air-heating operation includes neither the battery passage 14 nor the electrical apparatus passage 13. In other words, the circulation channel 106 bypasses the battery passage 14 and the electrical apparatus passage 13. This prevents the temperature of the heat medium in the circulation channel 106 from lowering during the air-heating operation due to heat exchange with apparatus not involved in the air-heating operation. The air-heating operation can thereby be executed with higher efficiency.

The controller 80 can also execute operation(s) other than the above-mentioned operations. For example, the controller 80 can execute an operation of heating the battery 51 by causing the heater 50 to heat the heat medium in the circulation channel 112 while circulating the heat medium in the circulation channel 112. This operation is executed when the battery 51 reaches an extremely low temperature in, for example, a cold climate area. Moreover, the controller 80 can heat the air in the vehicle cabin with the heater core 74 by causing the heater 71 to heat the heat medium in the circulation channel 102 while circulating the heat medium in the circulation channel 102. This operation is executed when the above-mentioned air-heating operation cannot be executed. Moreover, the controller 80 can execute an operation of preventing temperatures of the SPU 46, the PCU 47, and the motor from rising by circulating the heat medium in a circulation channel configured with the electrical apparatus passage 13 and the bypass passage 12.

Figure 6:
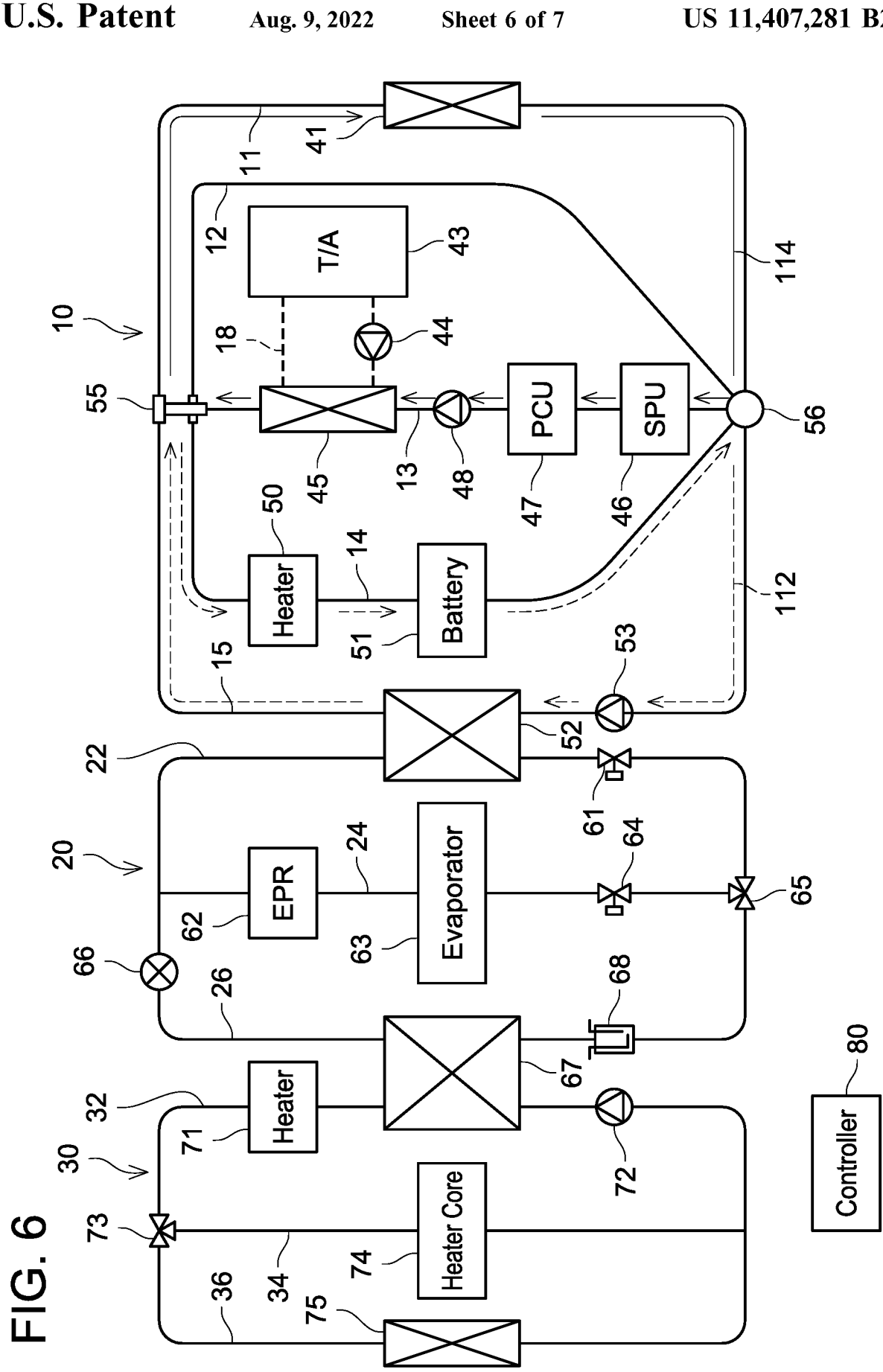
FIG. 6 is a circuit diagram of a heat management device of a variant.
Figure 7:
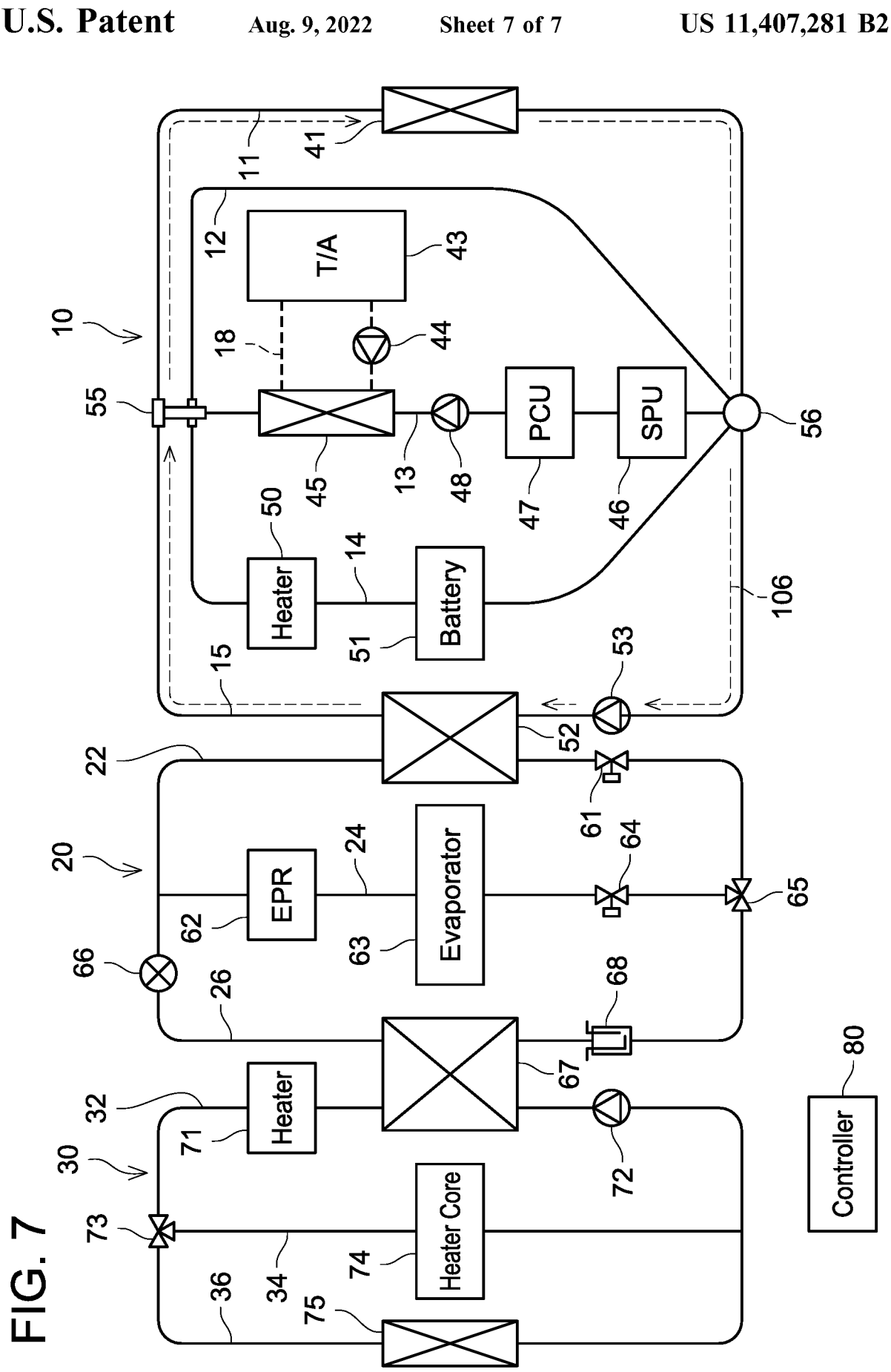
FIG. 7 is a circuit diagram of the heat management device of the variant.

In the above-described embodiment, the channels in the first heat circuit 10 are switched by the two three-way valves 42, 49. However, as in a variant shown in FIGS. 6 and 7, the first heat circuit 10 may include one five-way valve 55 in place of the three-way valves 42, 49, and the five-way valve 55 may switch the channels. In FIGS. 6 and 7, the upstream end of the low-temperature radiator passage 11, the upstream end of the bypass passage 12, the downstream end of the electrical apparatus passage 13, the upstream end of the battery passage 14, and the downstream end of the chiller passage 15 are connected to the five-way valve 55. The downstream end of the low-temperature radiator passage 11, the downstream end of the bypass passage 12, the upstream end of the electrical apparatus passage 13, the downstream end of the battery passage 14, and the upstream end of the chiller passage 15 are connected with each other via a reservoir tank 56. As shown in FIG. 6, when the pump 53 operates while the five-way valve 55 is controlled so that the heat medium flows from the chiller passage 15 to the battery passage 14, the heat medium circulates in the circulation channel 112. As shown in FIG. 6, when the pump 48 operates while the five-way valve 55 is controlled so that the heat medium flows from the electrical apparatus passage 13 to the low-temperature radiator passage 11, the heat medium circulates in the circulation channel 114. As shown in FIG. 6, the heat medium can also circulate simultaneously in the circulation channel 112 and the circulation channel 114. As shown in FIG. 7, when the pump 53 operates while the five-way valve 55 is controlled so that the heat medium flows from the chiller passage 15 to the low-temperature radiator passage 11, the heat medium circulates in the circulation channel 106. When the pump 48 operates while the five-way valve 55 is controlled so that the heat medium flows from the electrical apparatus passage 13 to the bypass passage 12, the heat medium circulates in the circulation channel configured with the electrical apparatus passage 13 and the bypass passage 12. As such, substantially like the heat management device 100 of FIGS. 1 to 5, the heat management device of FIGS. 6 and 7 can also switch the circulation channels in the first heat circuit 10 in which the heat medium flows.

Correspondence between components of the above-mentioned embodiment and components recited in the claims will be described below. The heater core 74 of the embodiment is an example of "air-heating apparatus". The chiller 52 of the embodiment is an example of "heat exchanger". The SPU 46, the PCU 47, and the motor built in the transaxle 43 of the embodiment are examples of "electrical apparatus". The low-temperature radiator 41 of the embodiment is an example of "radiator". The three-way valves 42, 49 of the embodiment are examples of "at least one control valve". The five-way valve 55 of the variant is an example of "at least one control valve". The air-heating operation of the embodiment is an example of "first process". The circulation channel 106 of the embodiment is an example of "first circulation channel". The battery-cooling operation of the embodiment is an example of "second process". The circulation channel 112 of the embodiment is an example of "second circulation channel". The electrical apparatus-cooling operation of the embodiment is an example of "third process". The circulation channel 114 of the embodiment is an example of "third circulation channel". The condenser 67 of the embodiment is an example of "cooler".

Specific examples of the present disclosure have been described in detail, however, these are mere exemplary indications and thus do not limit the scope of the claims. The art described in the claims include modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A heat management device configured to be mounted on a vehicle, the heat management device comprising:
    a first heat circuit in which a heat medium circulates, the first heat circuit comprising a heat exchanger passage, a battery passage, an electrical apparatus passage, and a radiator passage connected with each other;
    a second heat circuit in which a heat medium circulates;
    a heat exchanger configured to cool the heat medium in the heat exchanger passage and heat the heat medium in the second heat circuit by exchanging heat between the heat medium in the heat exchanger passage and the heat medium in the second heat circuit;
    air-heating apparatus configured to heat air in a cabin of the vehicle using the heat medium in the second heat circuit as a heat source;
    a battery configured to be cooled by the battery passage;
    electrical apparatus configured to be cooled by the electrical apparatus passage;
    a radiator configured to exchange heat between the heat medium in the radiator passage and outside air;
    at least one control valve configured to change a channel in the first heat circuit along which the heat medium flows; and
    a controller,
    wherein
    the controller is configured to execute a first process, a second process, and a third process,
    the controller is configured, in the first process, to cause the radiator to heat the heat medium in the radiator passage, cause the heat exchanger to exchange heat, and cause the air-heating apparatus to heat the air in the cabin while controlling the at least one control valve so that the heat medium in the first heat circuit circulates in a first circulation channel including the heat exchanger passage and the radiator passage,
    the controller is configured, in the second process, to cause the heat exchanger to cool the heat medium in the heat exchanger passage while controlling the at least one control valve so that the heat medium in the first heat circuit circulates in a second circulation channel including the heat exchanger passage and the battery passage and bypassing the radiator passage, and
    the controller is configured, in the third process, to cause the radiator to cool the heat medium in the radiator passage while controlling the at least one control valve so that the heat medium in the first heat circuit circulates in a third circulation channel including the radiator passage and the electrical apparatus passage and bypassing the heat exchanger passage.

2. The heat management device of claim 1, wherein the controller is configured to execute the second process and the third process simultaneously.

3. The heat management device of claim 1, wherein the first circulation channel bypasses the battery passage and the electrical apparatus passage.

4. The heat management device of claim 1, wherein the second circulation channel bypasses the electrical apparatus passage.

5. The heat management device of claim 1, wherein the third circulation channel bypasses the battery passage.

6. The heat management device of claim 1, further comprising a cooler configured to cool the heat medium in the second heat circuit.

* * * * *